June 1, 1937.   R. S. TOWNSEND ET AL   2,082,368
REGISTER FOR GASOLINE
Filed March 27, 1935

INVENTOR
Richard S. Townsend and
BY Eliot Farley
Pennie Davis Marvin & Edmonds
ATTORNEY Patented June 1, 1937

2,082,368

UNITED STATES PATENT OFFICE 2,082,368

REGISTER FOR GASOLINE

Richard Sullivan Townsend, Wayland, Mass., and Eliot Farley, Mount Kisco, N. Y.

Application March 27, 1935, Serial No. 13,188

2 Claims. (Cl. 235—130)

This invention relates to registers, and more particularly to a simple and effective device for indicating the quantity of gasoline which is consumed by a motor vehicle.

Many operators of motor vehicles are interested in the gasoline consumption of their cars, but no means has been available heretofore whereby the quantity of gasoline purchased and used can be totaled readily. A notebook, such as the operator sometimes uses, proves to be unsatisfactory because the user forgets to make the necessary entries. Also many people dislike arithmetic and consequently do not add the figures if they are correctly recorded in the notebook.

It is the object of the present invention to provide an inexpensive and readily accessible device which is manually operable to register the quantity of gasoline purchased, the total being accumulated automatically so that the user may read the amount with a minimum of effort.

While the device is intended primarily to be mounted on the cap of the gasoline tank, it can be used, with slight modification, on the instrument panel or elsewhere in the car which is accessible for registering and reading the amount of gasoline consumed.

Other objects and advantages of the invention will be apparent as it is better understood by reference to the following specification and accompanying drawing, in which.

Figure 1:
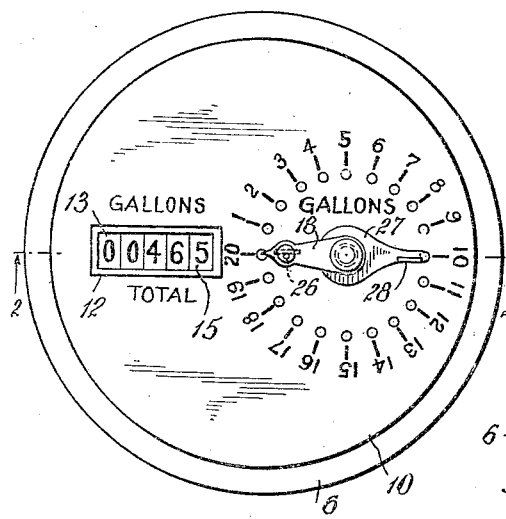
Fig. 1 is a plan view of the device.
Figure 2:
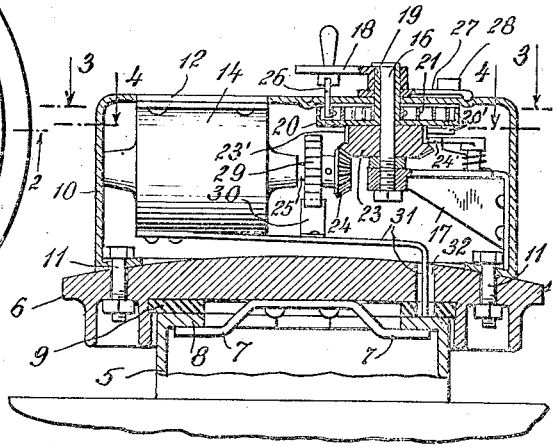
Fig. 2 is a transverse section through the device as mounted on the cap of a gasoline tank.
Figure 4:
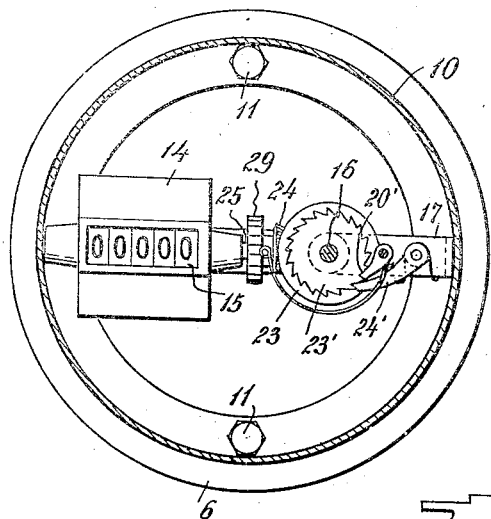
Fig. 4 is a section on the line 4—4 of Fig. 2.
Figure 3:
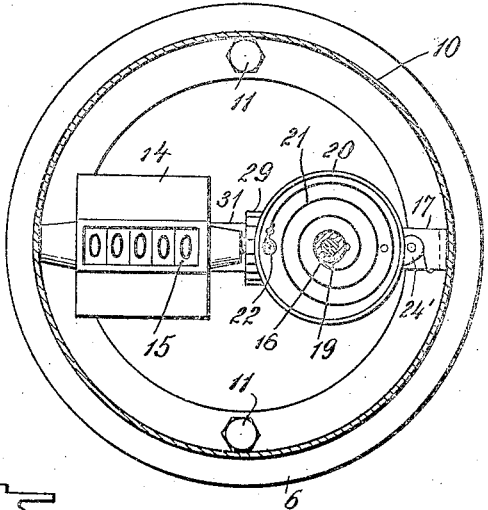
Fig. 3 is a section on the line 3—3 of Fig. 2.
Figure 5:
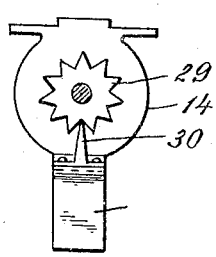
Fig. 5 is an enlarged detail in elevation of a portion of the mechanism.

Referring to the drawing, 5 indicates the filling opening of a gasoline tank attached to a motor vehicle. A cap 6 is provided with arms 7 on the underside adapted to engage a flange 8 so that the cap is firmly held in place, gasket 9 being provided to prevent escape of gasoline. This is the usual construction. The cap may be varied in form and detail as may be desired.

A casing 10 is secured to the cap 6 by bolts 11, or otherwise, and encloses the mechanism. The casing is provided with an opening 12 through which the indicia 13 of a registering mechanism 14 disposed within the casing may be observed. It will be understood that the registering mechanism may be of any form, or desired construction, consisting generally of a plurality of wheels or discs 15, each bearing numerals 0 to 9, with suitable transfer mechanism so that the amount is totaled in the usual way.

A spindle 16 is supported on the brackets 17 within the casing 10. An arm 18 is secured to a sleeve 19 on the spindle 16, the sleeve being in turn connected to a flanged disc 20 which encloses a spring 21. One end of the spring is connected to the sleeve 19 and the other to a pin 22 depending from the top of the casing 10. A beveled gear 23 is connected and adapted to be actuated by the disc 20 through a pawl 20', carried on the underside thereof, engaging a ratchet 23'. The pawl 24' prevents reverse movement of the gear 23. The gear 23 meshes with a beveled pinion 24 on the shaft 25 of the registering mechanism 14. Thus when the arm 18 is turned the registering mechanism is actuated. The path of the end of the arm 18 on the top of the casing 10 is divided, as indicated in Fig. 1, to represent gallons and the connections between the arm and the shaft 25 are proportioned so that the movement of the arm transfers the number indicated on the top of the casing 10 to the registering mechanism. In other words, if the arm 18 is moved to indicate ten gallons the registering mechanism will likewise register ten gallons.

After the arm 18 has been turned to the desired indicating position it is returned by the spring 21. A stop 26 projects upwardly from the top of the casing 10 limiting the backward movement of the arm. To prevent incorrect registration a second arm 27 is mounted loosely on the sleeve 19 so that it may be moved to the desired registering position in advance of the arm 18. A stop 28 projects upwardly from the arm 27 to limit movement of the arm 18. Thus the user may first set the arm 27 in the desired position and then turn the arm 18 to that position thereby registering the amount of gasoline which has been introduced to the tank. Only when the arm 18 is moved is there any actuation of the registering mechanism.

If the device is mounted, as indicated, upon the gasoline tank it is desirable to prevent tampering with the mechanism. For this purpose a star wheel 29 is mounted on the shaft 25 and is adapted to be engaged by a pawl 30 on a spring arm 31. The spring arm is secured at one end to the registering mechanism 14 and has a depending lip 31 which passes through an opening 32 in the cap 6 to engage the flange 8. Thus when the cap is in place on the tank, the pawl 30 is held in engagement with the star wheel 29 and the mechanism cannot be actuated. As soon as the cap is removed from the tank the star wheel is free and the amount of gasoline introduced to the tank can be registered in the manner indicated.

The device, as described, affords a simple and effective means to accumulate the figures representing successive additions of gasoline to the tank. Thus, in starting a trip one may read the indication of the registering mechanism and, by actuating the mechanism whenever gasoline is added, may observe at the end of the trip how much gasoline has been consumed. By comparing the figure with the mileage, as shown on the speedometer of the motor vehicle, the mileage per gallon of gasoline may be determined readily. As hereinbefore indicated the device need not be mounted necessarily upon the gasoline tank. A suitable mounting may be provided on the instrument panel.

Various changes may be made in the form, arrangement and construction of the parts without departing from the invention or sacrificing any of the advantages thereof.

What we claim is:

1. A register comprising a casing, means for removably mounting the casing upon a support, a registering mechanism within the casing, means for actuating the registering mechanism, and means actuated by the support when the register mechanism is mounted thereon for preventing actuation of the registering mechanism.

2. A register comprising a casing, a portion of which forms a removable closure for a filling nozzle of a receptacle, a registering mechanism within said casing, means for actuating the registering mechanism, locking means, a portion of said locking means engaging said filling nozzle when the casing is mounted thereon and causing another portion to prevent operation of said registering means.

ELIOT FARLEY.
RICHARD SULLIVAN TOWNSEND.